Aug. 28, 1962 L. E. LAKJER 3,051,779

WIDE SCREEN TELEVISION APPARATUS

Filed May 13, 1959 2 Sheets-Sheet 1

INVENTOR.
LEO E. LAKJER
BY Karl L. Spivak
ATTORNEY

WIDE SCREEN TELEVISION APPARATUS

Filed May 13, 1959 2 Sheets-Sheet 2

INVENTOR.
LEO E. LAKJER
BY Karl L Spivak
ATTORNEY

United States Patent Office 3,051,779 Patented Aug. 28, 1962

3,051,779
WIDE SCREEN TELEVISION APPARATUS
Leo E. Lakjer, Philadelphia, Pa., assignor of one-half to Louis Marcus, Philadelphia, Pa.
Filed May 13, 1959, Ser. No. 812,948
6 Claims. (Cl. 178—6.8)

My invention relates to a television apparatus and more particularly relates to a system for the transmission and reception of video signals so that the visible image thereof will be reproduced upon and received as a wide field twice that of the present apparatus.

Present day television systems as regulated and approved by the Federal Communications Commission utilizes a 4 to 3 aspect ratio of image production whereby the scanning both at the source and the receiver will produce an image width of 1⅓ times that of the image height. That is, for undistorted image production, both the television camera and receiver will scan so that for every 4 inches in width a corresponding 3 inches in height will be accommodated.

While a 4 to 3 aspect ratio is satisfactory on individual close-up work, or to scan background alone, it is easily apparent that when the telecaster attempts to show a panoramic background together with an individual, the individual figures will be accordingly reduced in size as to be almost indistinguishable, particularly in the smaller receivers. In addition, it is frequently desirable to simultaneously show different portions of a scene occurring at divergent parts of the stage or in different studios entirely. In the past, this was accomplished by shifting from one camera to another by way of a studio monitor, or by superimposing electronically one portion of an image upon another by vignetting.

It is therefore an object of my invention to provide a wide screen television apparatus wherein widely divergent portions of a scene may be viewed simultaneously.

It is another object of my invention to provide a wide screen televesion apparatus capable of being used with existing color television circuits and that will have a three dimensional effect upon the viewer.

Another object of my invention is to provide a wide screen television apparatus wherein no attendant reduction in size of image for an individual being televised will necessarily result when a panoramic view is being televised.

Another object of my invention is to provide a wide screen television apparatus which may be monitored by the viewer at home when two or more scenes are being televised.

Another object of my invention is to provide a wide screen television apparatus which will require no departure from existing FCC regulations nor infringe thereupon.

Another object of my invention is to provide a wide screen television apparatus wherein the 4 to 3 aspect ratio will be preserved in the studio and during transmission, but will permit reception at an 8 to 3 aspect ratio.

Other objects of my invention are to provide an improved device of the character described that is easily and economically produced, which is sturdy in construction, and which is highly efficient and effective in operation.

With the above and related objects in view, my invention consists in the details of construction and combination of parts as will be more easily and fully understood from the following description when read in conjunction with the accompanying drawing in which.

Figure 1:
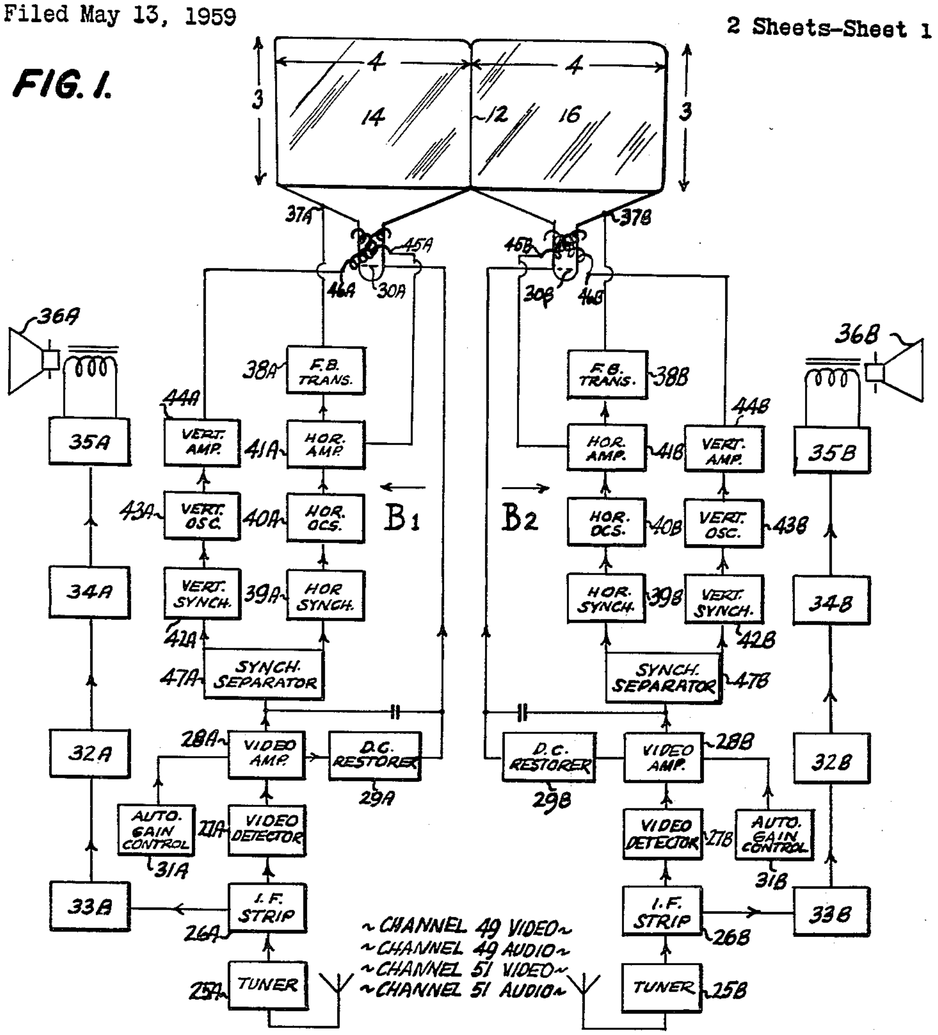
FIG. 1 is a schematic diagram of a wide screen television receiver embodying my invention.
Figure 2:
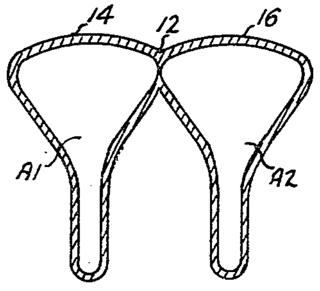
FIG. 2 is a sectional view of a television receiver tube upon which a wide screen image may be superimposed.

Referring now in greater detail to the drawings in which similar reference characters refer to similar parts, I show in FIGS. 1 and 2 a wide screen television apparatus comprising a pair of cathode ray tubes, generally designated as A1 and A2 integrally connected mechanically by a thin web 12.

Each of the tubes A1 and A2 are of identical conventional rectangular construction having substantially rectangular glass face plates 14 and 16 respectively, joined at and by the thin web 12.

The web 12 may be of glass or metal and has a thickness of no more than .025 inch but preferably commensurate with the vertical sweep spacing so as not to interfere with the continuity of a picture image across the web. The respective bowls of the tubes A1 and A2 each terminate in a neck portion 18 and 20 in which is mounted the usual electron gun.

In FIG. 1 I show a schematic flow diagram of the electrical circuitry representing television receivers B1 and B2 to which the tubes A1 and A2 are respectively electronically connected. For purposes of simplicity, the circuits of the receiver B1 have the reference numeral "A" suffixed thereto while the circuits of receiver B2 have the suffix "B" appending the reference numeral since each is identical in all respects. Both of the receivers B1 and B2 are fed by a common power supply (not shown) and contain tuners 25 which are adapted to simultaneously accommodate a pair of carrier channels, as for example channels 49 and 51. Tuner 25 accommodates both RF and mixer tubes and feeds into an IF strip 26 containing tubes to amplify both IF video and IF sound circuits. In the usual manner, video detectors 27 and video amplifiers 28 amplify and demodulate the respective video signals preparatory to impressing them upon the grids 30 of the tubes A1 and A2. Again in the usual manner, an automatic gain control 31, is provided. The conventional D.C. restorer circuits 29 are incorporated in the usual manner.

The audio components are amplified by an IF strip 32 through a conventional sound trap 33. The audio components are then demodulated by sound detectors 34 followed by audio amplification at 35 and are thereafter impressed upon speakers 36A and 36B.

High voltage is supplied to the accelerating anode or aquadag of the picture tubes A1 and A2 at 37A and 37B respectively from a conventional high voltage source such as a flyback transformer 38 applying either the blocking or multi-vibrator type and synchronized by the incoming horizontal pulse, which in turn drives the horizontal amplifier tube, which is the basic flyback transformer type circuit.

A horizontal sweep circuit comprising a horizontal synchronizer 39, a horizontal oscillator 40 and horizontal amplifier 41 and a vertical sweep circuit comprising a vertical synchronizer 42, a vertical oscillator 43 and a vertical amplifier 44 cause scanning of the electron beam by electrostatic or electromagnetic deflection means 45 and 46 respectively to define a raster upon the face plate phosphor of each tube. Focusing and positioning of the raster is performed separately and independently upon each tube A1 and A2.

As represented in FIG. 1, either separate or common horizontal and vertical sweep circuits may be employed for the tubes A1 and A2. In either event, both the horizontal and vertical sweeps on both tubes must be maintained in time, phase and positioning by a synchronizing separator 47 which locks both the horizontal and vertical oscillations of both tubes. I have shown two complete separate block diagrams indicating two complete, separate receivers joined together only at the cathode tubes by the thin web 12. However, my invention incorporates all modifications wherein the respective circuits of the two receivers may be made partially common thereby using fewer parts.

Thus, the images produced on the face plates 14 and 16 will be laterally juxtaposed since they are synchronized and continuous with the transmitter carrier signals. If two cameras are televising a wide scene, the image produced on the face plate will reproduce two separate images which appear as an apparent continuous picture, since the carrier waves and signals are accordingly interlocked and synchronized at the control room as will be more fully described herein below. Thus, by showing two adjacent images, each of 4 to 3 aspect ratio, laterally juxtaposed, a resultant composite 8 to 3 aspect picture will be reproduced.

Sound, if carried in separate carriers may produce the equivalent of "stereophonic" sound through the separate speakers 36A and 36B adjacent the outboard ends of the two tubes A1 and A2 or spaced divergently within the televiewer's room. Thus, if two divergently spaced scenes are televised at the studio, microphones placed at the respective scenes will apportion the audio which may then be transmitted upon separate carriers to produce sound at the speakers as herein before described. It is easily seen that by televising an orchestra by two separate video and audio systems, a wide screen image will be reproduced with the illusion of relative sound intensity at the respective divergent portions of the image at the screen or face plate, if the microphones are discretely placed within the studio.

Figure 6:
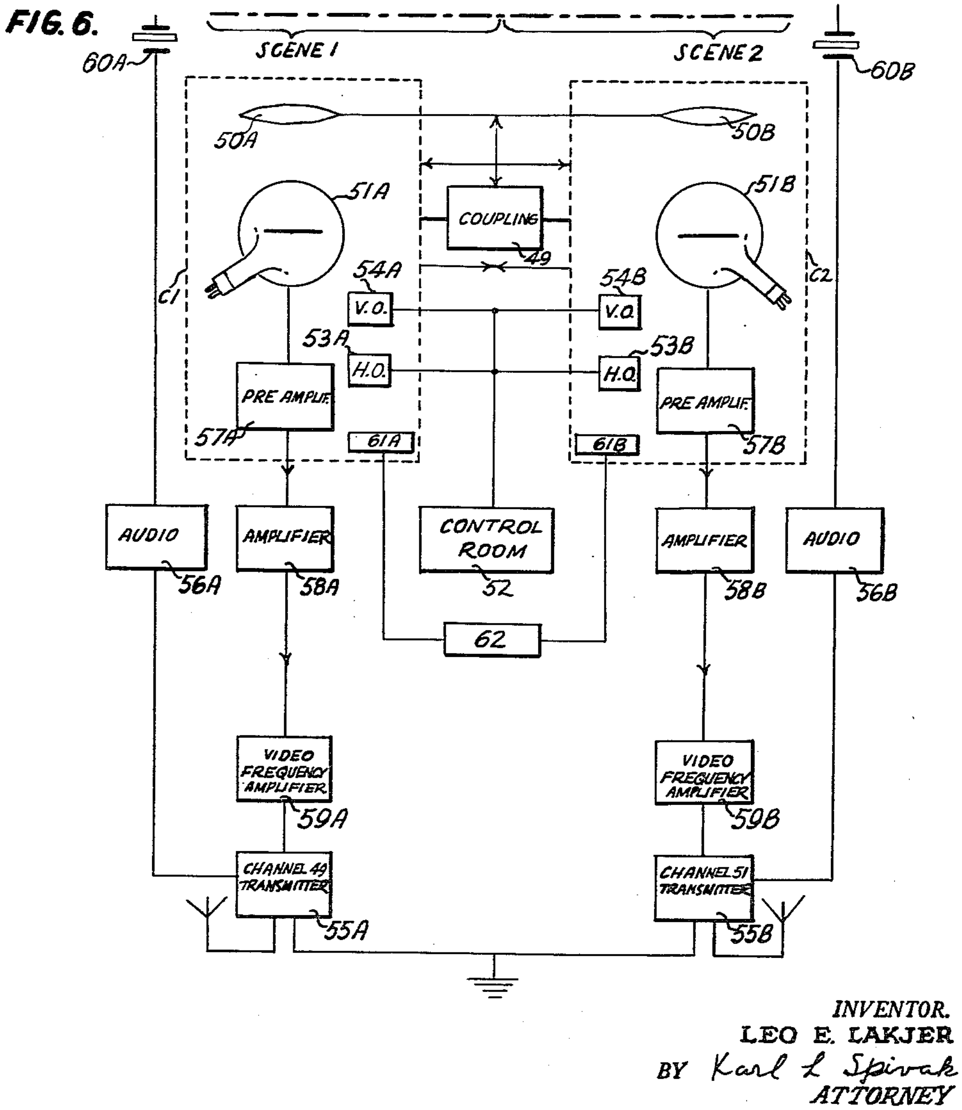
FIG. 6 is a schematic diagram of a wide screen television camera apparatus employed with my invention.

Referring now to FIG. 6, I show a diagrammatic telecasting system compatible with my receiving system wherein conventional television cameras C1 and C2, represented by broken lines, are mechanically linked by a coupling device 49. Each camera C1 and C2 will scan at a 4 to 3 aspect ratio, and in designation thereof, the reference numerals again are suffixed by the letters "A" and "B" respectively. The cameras each comprise a lens 50 which produce an image of the scene upon the mosaic of inconoscope tubes 51.

The synchronising generators in the control room 52 produce conventional horizontal, vertical, blanking and equalizing pulses which are fed to the respective iconoscope tubes 51 of the respective cameras C1 and C2. This in turn locks the respective horizontal oscillators 53 and vertical oscillators 54 and produces the proper synchronization of picture information by applying the proper equalizing and blanking pulses to the grid of the inconoscopes.

Conventional microphones 60A and 60B feeding audio circuits 56 are placed in the studio to apportion the sound to be transmitted. I prefer to place the microphones divergently to produce complete sound pickup. The audio is then transmitted upon separate carriers 55A and 55B to produce sound at the speakers as hereinbefore described. In such a manner, the equivalent of "stereophonic" sound will be produced.

The coupling 49 is a fixed mechanical linkage which interconnects the two cameras C1 and C2 at the body portions thereof. The spacing of the cameras is so arranged that the images of the scenes 1 and 2 cast upon the mosiac are continuous, laterally juxtaposed and without overlapping. The scene of camera C1 may be observed in viewer 61A and the scene of camera C2 may be observed in viewer 61B. In addition, I show a common viewer 62 in which the entire composite of scene 1 and scene 2 may be observed by one operator.

As can be seen, I desire to use existing equipment so far as is possible with certain modifications to carry forward my invention with the least possible expenditure. While my invention has been described with this thought in mind, it can be readily observed that special equipment can be constructed to do the same work. Any special equipment accomplishing the same function in the same way is within the scope of my invention.

As has hereinbefore been set forth, each camera picks up a field in a 4 to 3 aspect ratio which is synchronized with the other camera in displacement, time and phase. It is of course possible to decouple the cameras, and televise single scenes or widely divergent scenes. It is also to be observed that microphones 60A and 60B are discreetly placed adjacent the outboard ends of the scenes 1 and 2.

Figure 3:
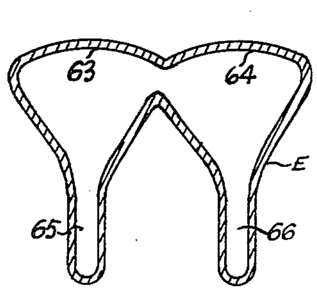
FIG. 3 is a sectional view of a modification of the cathode ray television tube which may be employed with my invention.

In FIG. 3, I show a receiver tube modification E comprising a pair of cathode ray tubes molded as one and whose chambers communicate and are evacuated as a single unit. The face plate configuration is again rectangular but each plate 63 and 64 are arcuately convex outwardly as related to the positioning of the electron guns in the respective neck portions 65 and 66. Each face plate defines a 4 to 3 aspect ratio.

Figure 4:
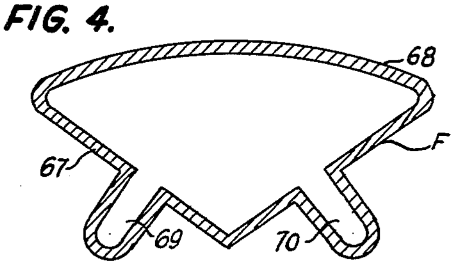
FIG. 4 is a sectional view showing another modification of the cathode ray television tube.

In FIG. 4, I show a receiver tube modification F comprising a substantially conical bowl portion 67, a single outwardly convex face plate 68, of 8 to 3 aspect ratio, and a pair of necks 69 and 70 communicating with the bowl portion for holding the electron guns. The projection of the image upon the face plate phosphor is precisely as in the prior described receiver tubes.

Figure 5:
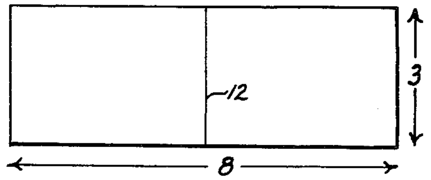
FIG. 5 is a front view of the configuration of the cathode ray tube face plate showing an 8 to 3 aspect ratio.

In FIG. 5, I show the front view of the configuration of the cathode ray tube face plate contemplated by my invention. If two tubes are joined, a thin web 12 would be visible.

Although my invention has been described in considerable detail, such description is intended as being illustrative rather than limiting. Since the invention may be variously embodied and the scope of the invention is to be determined as claimed.

I claim:

1. A television receiver tube apparatus comprising two cathode ray tubes having substantially rectangular glass face plates, said glass face plates being substantially the same size and horizontally juxtaposed, said two cathode ray tubes being joined together at said face plates by a single thin metal or glass web whereby the glass face plates are continuous and laterally juxtaposed.

2. A television receiver tube apparatus comprising two cathode ray tubes, said tubes being joined to form a single face plate and each consisting of a neck portion, a bowl portion, an electron gun, each of said electron guns projecting its respective image upon only one-half of the said face plate in horizontal juxtaposed relation, an electron target and substantially rectangular face plate, said cathode ray tubes having chambers intercommunicating and evacuated as one, and said cathode ray tubes being joined along respective adjacent edges of rectangular face plates whereby the face plates are continuous and laterally juxtaposed.

3. A television receiver tube apparatus comprising a substantially conical bowl portion, a single outwardly convex substantially rectangular face plate communicating with said conical bowl portion having an aspect ratio of 8 to 3, a pair of electron guns contained in two oppositely disposed neck portions communicating with said conical bowl portion, said electron guns mounted in the respective neck portions defining an angle between them of more than 0° and less than 180°, said electron guns directing respective images upon the said face plate in horizontal juxtaposed relation, whereby the images cast upon the face plate phosphor by the two electron guns are continuous and laterally juxtaposed.

4. A cathode ray image producing tube comprising two evacuated chambers, two electron guns disposed in horizontal parallel arrangement within respective horizontal parallel neck portions extending from respective evacuated chambers, two face plates forming front of evacuated chambers, said face plates each receiving an image from respective electron guns, said face plates being horizontally juxtaposed and coplanar, said respective images originating from a separate signal source, said evacuated chambers having one common side forming a thin separation therebetween, whereby the respective images cast upon the face plate phosphors respectively by the electron guns are continuous and laterally juxtaposed.

5. A cathode ray image producing tube including two adjacent evacuated bowl portions, each of said bowl portions having a neck portion communicating therewith and rearward thereof and faceplates forming the front thereof, said bowl portions arranged in horizontal, adjacent position relative to each other and said neck portions mounted in the respective bowl portions in horizontal adjacent positions relative to each other; a single common relatively thin web along side of each said bowl portion immediately adjacent the other, said web forming a common side of the bowl portions and forming a portion of the inner side of each said bowl portion, said web joining said respective faceplates and extending rearward thereof, said web being of relatively minute thickness compared to the combined width of the faceplates; an electron gun contained within each respective neck portion, said electron guns receiving impulses from separate signal sources, said signal sources forwarding horizontally adjacent scenes respectively to each said electron gun, said electron guns casting images of respective adjacent scenes upon respective face plates, whereby the images cast upon the faceplate phosphor by the electron guns are continuous and laterally juxtaposed.

6. The invention of claim 5 wherein the said web is vertical and is a flat glass portion common to the said evacuated bowls.

References Cited in the file of this patent

UNITED STATES PATENTS

| | | |
|---|---|---|
| 1,841,487 | Lewis | Jan. 19, 1932 |
| 2,164,297 | Bedford | June 27, 1939 |
| 2,219,149 | Goldsmith | Oct. 22, 1940 |
| 2,283,383 | McNaney | May 19, 1942 |
| 2,783,406 | Vanderhooft | Feb. 26, 1957 |

FOREIGN PATENTS

| | | |
|---|---|---|
| 467,195 | Great Britain | June 14, 1937 |